25662
Dec. 4, 1962 W. O. STANTON 3,067,295
STEREOPHONIC PHONOGRAPH PICK-UP DEVICE
Filed Aug. 4, 1958 8 Sheets-Sheet 1
FIG. 1
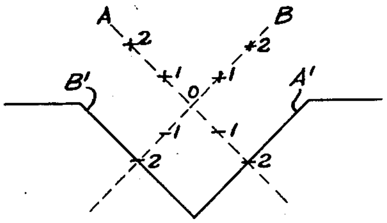
FIG. 2
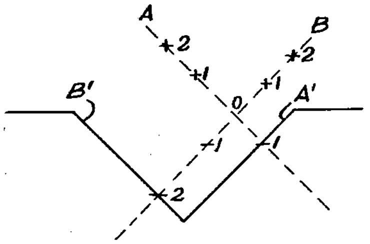
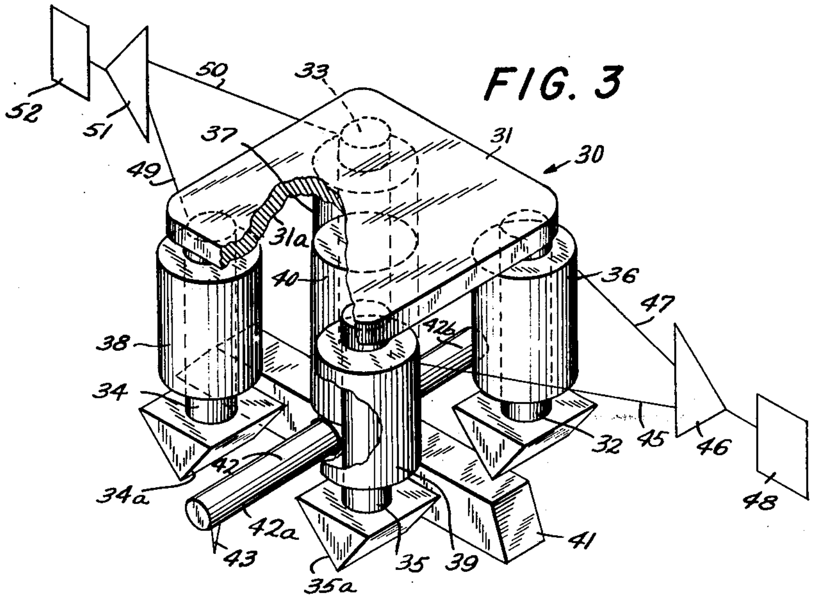
FIG. 4
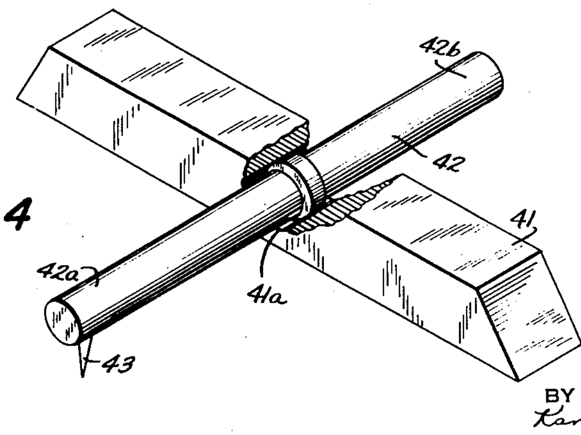
INVENTOR
WALTER O. STANTON
BY
Kane, Dalsimer and Kane
ATTORNEYS

STEREOPHONIC PHONOGRAPH PICK-UP DEVICE

Filed Aug. 4, 1958 8 Sheets-Sheet 2

INVENTOR
WALTER O. STANTON

BY: Kane, Dalsimer and Kane
ATTORNEYS

STEREOPHONIC PHONOGRAPH PICK-UP DEVICE
Filed Aug. 4, 1958 8 Sheets-Sheet 3
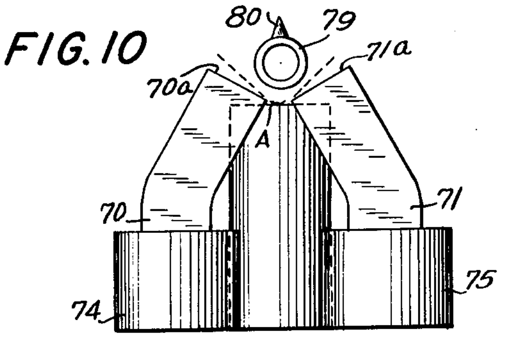
FIG. 10
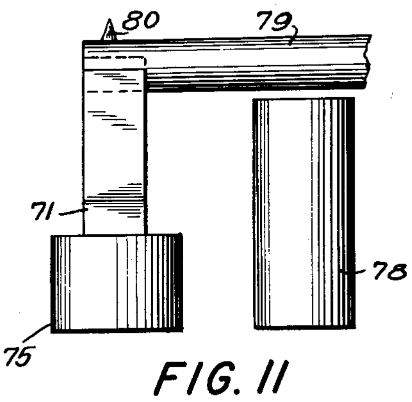
FIG. 11
FIG. 12
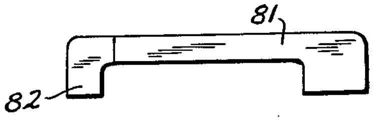
FIG. 14
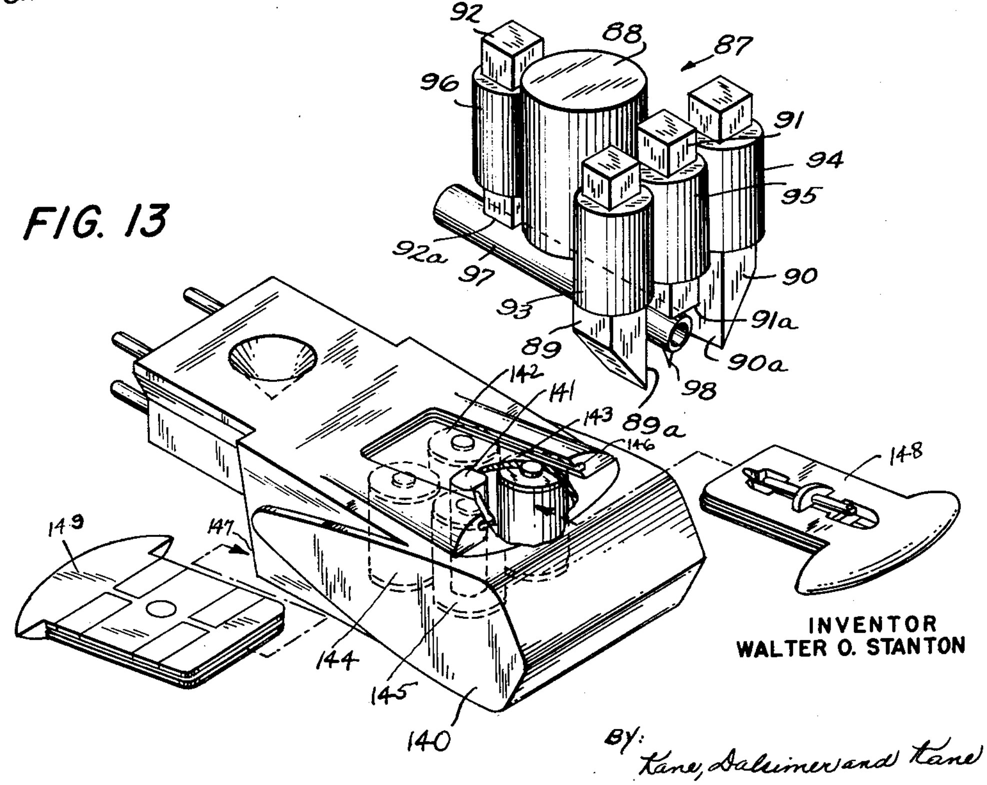
FIG. 13, FIG. 14
INVENTOR
WALTER O. STANTON
BY: Kane, Dalsimer and Kane
ATTORNEYS

INVENTOR.
WALTER O. STANTON

BY

*Kane, Dalsimer and Kane*

ATTORNEYS

INVENTOR.
WALTER O. STANTON
BY
Kane, Dalsimer and Kane
ATTORNEYS

INVENTOR.
WALTER O. STANTON

BY
Kane, Dalsimer and Kane

ATTORNEYS

INVENTOR.
WALTER O. STANTON
BY
Kane, Dalsimer and Kane
ATTORNEYS

INVENTOR.
WALTER O. STANTON
BY
Kane, Dalsimer and Kane
ATTORNEYS

United States Patent Office 3,067,295

Patented Dec. 4, 1962

3,067,295

STEREOPHONIC PHONOGRAPH PICK-UP DEVICE

Walter O. Stanton, Laurel Hollow, N.Y., assignor to Pickering & Company, Inc., a corporation of New York Filed Aug. 4, 1958, Ser. No. 753,046
11 Claims. (Cl. 179—100.41)

This invention relates generally to an improved sound reproducer and more particularly to an improved phonograph pick-up device of the magnetic type for use in reproducing stereophonic or binaural sound from the groove of a phonograph record.

Stereophonic or binaural reproduction of sound consists in the use of at least two speakers spaced from one another so that upon activation of the speakers the listener will receive the impression of sound being emitted from two different locations. When a phonograph record is used as the information storage unit, it must be specially grooved for such a stereophonic system since the system is actually a two-channel system and information from a single record groove is fed to two individual speakers with the system determining which portion of the information will be fed to each of the speakers.

A stereophonic system in use today embodies the information in the record in the form of a V-groove as shown in FIG. 1 of the drawings herein which is a diagrammatic representation of the V-groove. Rectangular coordinates having axis labeled "A" and "B" are superimposed on the groove in FIG. 1 and each of these axis is at a 45 degree angle with the vertical and perpendicular to one side of the groove and parallel to the other groove side.

In this system sound for one speaker is determined by the change in position of one side of the groove along the axis normal to it, and sound for the second speaker is determined by the change in position of the other side of the groove along the axis normal to it. Thus, in FIG. 1 side A′ is shown at point −2 on the A axis, and side B′ is shown at point −2 on the B axis. Therefore the point (−2, −2) designates the instantaneous position of a stylus in this groove. In FIG. 2 side A′ is shown at −1 on the A axis and side B′ is shown at −2 on the B axis. Thus point (−1, −2) designates a second instantaneous position of a stylus in the groove.

In the groove of FIG. 2, the position of the stylus is interpreted by the sound reproducer, usually by mechanical means situated in the pick-up head, to actuate one of the speakers in accordance with the component of stylus movement along the A axis toward or away from side A′; and the other speaker in accordance with the component of stylus movement along the B axis.

A second system in use today for reproduction of stereophonic sound utilizes a record cut with a groove which is substantially V-shaped with the information embodied therein on axes, such as A and B discussed above. However, in this second system, the axis A is perpendicular to the vertical and the axis B is perpendicular to the horizontal. In other words, in this system the axes are shifted or rotated 45 degrees about the zero point. In this system, the information in the record is sensed in the same manner as the first system mentioned above except that the movements of the stylus which is sensed is vertical and horizontal.

The present invention is concerned primarily with the first system discussed above which will be referred to as the V-groove system. However, as will appear more fully from the description which follows and especially from the description of one of the alternate forms of the invention, the improved phonograph pick-up which is the subject of this invention can be modified for use in the second system discussed above, which will be referred to as the "lateral-vertical" system, or any like system wherein the coordinates of the record groove are shifted or rotated.

The invention herein disclosed has for its principal object the provision of a stereophonic pick-up device which will give uniform and accurate response over a wide frequency band, will produce a minimum of cross-talk and will allow for considerable amplification of the signal at the pick-up head while substantially eliminating detection of extraneous signals.

Another object of this invention is to provide a stereophonic pick-up device which can be employed with a binaural system utilizing pronograph records having information in V-grooves and which can be easily modified for utilization with phonograph records having information in lateral-vertical grooves, or which can be modified to detect information in phonograph record grooves utilizing other rotated axis systems.

A further object of this invention is to provide a stereophonic pick-up device employing improved mounting of the stylus supporting armature which allows movement of the armature with a minimum of effort in all necessary directions and maintains the armature in a neutral position when it is not in use, and which employs an improved magnetic coupling member whereby an armature of very low mass can be utilized so that a minimum of record wear results.

A further object of this invention is to provide a stereophonic pick-up device which is relatively simple, rugged, of strong construction and economical to manufacture and which will provide satisfactory service over long periods of time.

A still further object of the invention is to provide a stereophonic pick-up having a replaceable stylus assembly which permits the stylus and its associated parts to be replaced when it is worn or damaged and which has most of the expensive and close tolerance parts incorporated in the body of the pick-up so that the replaceable stylus assembly can be relatively simple and inexpensive to replace.

And still another object of the invention is to provide a molded plastic stereophonic pick-up with the magnetic source, pole pieces and coils molded therein so that there can be no relative motion or vibration therebetween and the wiring connections can be molded integrally in the pick-up at the time of manufacture with the result that the electrical connections and circuits are effectively protected from moisture and corrosion while the moving parts which are subject to wear are mounted upon a replaceable stylus assembly, thereby providing a substantially permanent portion of the pick-up and a replaceable portion.

Several stereophonic pick-up devices embodying the invention and the manner of using the same are described herein with references to the drawings in which:

FIG. 1 is a diagrammatic representation of a phonograph record groove with rectangular coordinates superimposed therein and indicating one position of a phonograph stylus in the groove;

FIG. 2 is a diagrammatic representation of a phonograph record groove with rectangular coordinates superimposed thereon and indicating a second position of a phonograph stylus in the groove.

FIG. 3 is a partially diagrammatic simplified perspective view of a stereophonic pick-up device employing the teaching of this invention and illustrating the pole structure and armature and mounting therefor;

FIG. 4 is a perspective view of the armature and stylus used in the embodiment of the invention shown in FIG. 3 with portions of the mounting cut away to illustrate the manner in which the armature is supported by the mounting;

FIG. 10 is a segmentary end view of another form of this invention which utilizes an alternate means of compensation;

FIG. 11 is a segmentary side view of the structure which is illustrated in FIG. 10;

FIG. 12 is a side view of a stereophonic pick-up device constructed in accordance with the teachings of this invention mounted on a phonograph tone arm;

FIG. 13 is an exploded perspective view of a sterophonic pick-up device constructed in accordance with the teachings of this invention adapted for reverse side play;

FIG. 14 is a simplified segmentary perspective view of a stereophonic pick-up constructed in accordance with the teachings of this invention which is modified for use in connection with phonograph records employing grooves cut in accordance with the lateral-vertical system;

Figure 5:
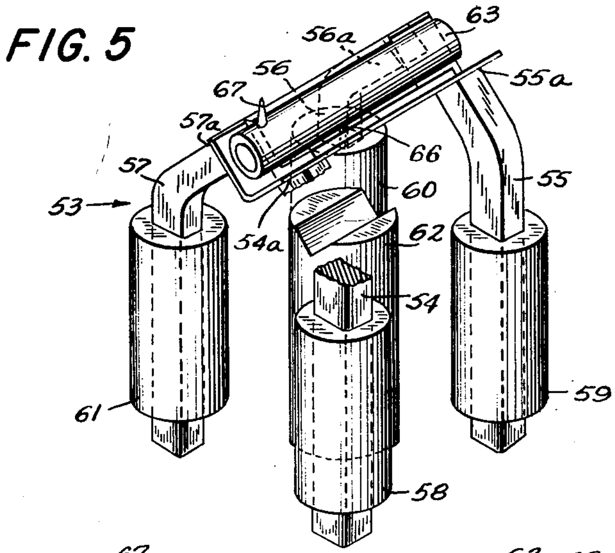
FIG. 5 is a simplified inverted segmentary perspective view of another embodiment of this invention illustrating its pole structure and armature mounting.

The pole structure of a sterophonic phonograph pick-up device constructed in accordance with the teachings of this invention is illustrated in FIG. 3, which is a partially diagrammatic view, and is designated therein generally by the numeral 30. The pole structure consists essentially of a substantially square main plate 31 having an undersurface 31*a* to which the upper ends of cores 32, 33, 34, and 35 are attached. The cores are attached to the main plate undersurface in such manner that each of the four corners of the main plate has a core extending downwardly therefrom. The main plate and cores are formed of a material of high magnetic permeability, such as soft iron or a nickel iron alloy or any other suitable magnetic material, and each of the cores, which is solid and cylindrical in configuration, forms the core of a surrounding electric coil. Electric coils 36, 37, 38, and 39 are shown surrounding cores 32, 33, 34, and 35 respectively.

The lower end of each of the cores is formed with a pole face which is inclined at a 45 degree angle from the horizontal. Thus cores 32, 33, 34, and 35 have formed at their lower ends pole faces 32*a*, 33*a*, 34*a* and 35*a* respectively which are inclined so that the planes of faces 32*a* and 33*a* intersect at a right angle above the faces as do the planes of pole faces 34*a* and 35*a*.

The geometrical relationship of the pole faces and the reason therefor will become evident below.

Permanent magnet 40 of solid cylindrical shape is disposed with its upper end adjacent undersurface 31*a* of the main plate and extends downwardly so that its lowermost end is approximately the same distance from undersurface 31*a* as the lower ends of the coils.

Mounting member 41, which has its uppermost surface adjacent the lower end of permanent magnet 40, is provided with cylindrical opening 41*a* in its center so that armature 42 which extends therethrough is disposed within the field of the permanent magnet and between opposite pole faces. End 42*a* of the armature from which stylus 43 extends is disposed between faces 34*b* and 35*b* while end 42*b* of the armature is disposed between faces 32*b* and 33*b*.

Mounting member 41 is formed from any substantially rigid non-magnetic material and diaphragm 44 which is formed of any soft pliable material, such as rubber, is fastened to the side walls of the cylindrical opening and surrounds a portion of the armature to support it and prevent it from butting against the mounting member. The armature is free to move within opening 41*a* without touching the mounting member and the diaphragm prevents unwanted oscillations of the armature by providing damping.

Armature 42, which is a hollow cylindrical member, is mounted so that its ends 42*a* and 42*b* extend for equal lengths from the diaphragm. The armature is formed from a magnetic iron which is of high permeability and low reluctance in order that there will be the least magnetic drop in the armature from its center to either end. The stylus can be a jewel needle or any other suitable material which is used for this purpose.

Mounting member 41 and diaphragm 44 normally maintain armature 42 in a neutral position when no force is being applied to stylus 43. In the neutral position armature end 42*a* is equally distant from faces 34*b* and 35*b* and armature end 42*b* is equally distant from faces 32*b* and 33*b*.

This assembly has four distinct magnetic paths. One magnetic path is composed of the upper end of permanent magnet 40, main plate 31, coil core 35, pole face 35*a*, armature end 42*a*, and the lower end of the permanent magnet.

A second magnetic path is composed of the upper end of permanent magnet 40, main plate 31, coil core 32, pole face 32*a*, armature end 42*b*, and the lower end of the permanent magnet.

A third magnetic path is composed of the upper end of the permanent magnet, the main plate, coil core 34, pole face 34*a*, armature end 42*a*, and the lower end of the permanent magnet.

The fourth magnetic path is composed of the upper end of the permanent magnet, the main plate, core 33, pole face 33*a*, armature end 42*b*, and the lower end of the permanent magnet.

Each of the magnetic paths has flux flowing therethrough which is developed by the permanent magnet and each path contains an air gap between the armature and the respective pole face. Since an air gap presents a very high reluctance to the flow of magnetic flux, any change in the air gap in any of these magnetic paths will result in a substantial change in the amount of flux flowing in that path.

Considering the first magnetic path discussed above, when armature end *42a* is stationary, constant lines of flux flow in the magnetic path. However, if armature end *42a* is moved perpendicularly toward pole face *35a*, the air gap between armature end *42a* and pole face *35a* would be decreased, thereby reducing the reluctance of the magnetic path associated therewith and increasing the amount of flux flowing. Such movement of armature end *42a* causes movement of armature end *42b* away from pole face *32a*, thereby increasing the air gap in the second magnetic path, resulting in a decrease in the flux flowing in that path. The decrease of flux in the second path which results is approximately equal to the increase of flux flowing in the first path.

Movement of armature 42 normal to pole faces *35a* and *32a* cannot affect the third and fourth magnetic paths since such movement is parallel to pole faces *33a* and *34a* and cannot change the air gaps in those paths. Likewise movement of armature 42 normal to pole faces *33a* and *34a* cannot affect the flux flowing in the first and second magnetic paths.

A change in magnetic flux flowing in the core of coil 36, 37, 38, or 39 will generate a voltage in that coil. Upon the movement of armature end 42a toward pole *35a* and armature end *42b* away from pole face *32a* opposite polarity signals are generated in coils 36 and 39, which are of substantially equal amplitude if the coils have equal numbers of turns. Coils 36 and 39 are connected electrically so as to add the voltages generated in these coils by the movement of the armature which results in a single signal of twice the magnitude of either of the generated signals. Thus coils 36 and 39 act as a pair to detect movement of armature 42 toward or away from pole faces *35a* and *32a* and coils 37 and 38 act in the same manner as a coil pair to detect movement of armature 42 towards or away from pole faces *33a* and *34a*.

In FIG. 3 the numeral 45 indicates diagrammatically the signal generated in coil 39 being fed to amplifier 46 and the numeral 47 indicates diagrammatically the signal generated in coil 36 being fed to amplifier 46. The signals generated in the coils can be combined in the pick-up head, at the amplifier or at any convenient point so that the signal fed from amplifier 46 to speaker 48 is the sum of the amplitudes of the signals generated in coils 39 and 36. Likewise the signals generated in coils 38 and 37 respectively can be combined at any convenient point. In FIG. 3, the signals generated in these coils are indicated diagrammatically by the numerals 49 and 50 being fed into amplifier 51 so that the some of their amplitudes can be applied to speaker 52.

Any change in position of side B′ in FIGS. 1 and 2 along the B axis would result in movement of stylus 43 and armature 42 toward or away from pole faces *35a* and *32a*, which would be detected by coils 39 and 36 and result in an audio signal applied to speaker 48, and any change in position of side A′ in FIGS. 1 and 2 along the A axis would result in movement of stylus 43 and armature 42 toward or away from pole faces *34a* and *33a*, which would be detected by coils 39 and 36 and result in an audio signal applied to speaker 52. Thus the detection of binaural sound from a V-groove is achieved by my pick-up.

It is also noted that there is a hum-bucking feature of this device. Coils 39 and 36 are connected electrically so as to add the amplitudes of the opposite polarity signals generated by movement of the armature. Hum signals generated in coils 39 and 36 by extraneous fields will be of the same polarity so that these will cancel each other out. The same effect is achieved in coils 37 and 38 so that signals induced in these coils by extraneous fields will also cancel out. Thus the coils are wound so as to be series aiding for desired generated signals and series opposed for undesired hum signals resulting from extraneous noise.

Figure 7:
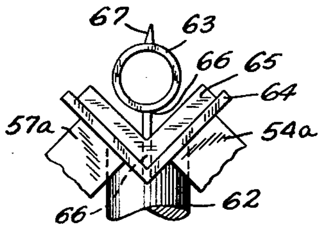
FIG. 7 is a partially sectional segmentary end view of the armature and armature mounting utilized in the embodiment of the invention illustrated in FIG. 5.
Figure 6:
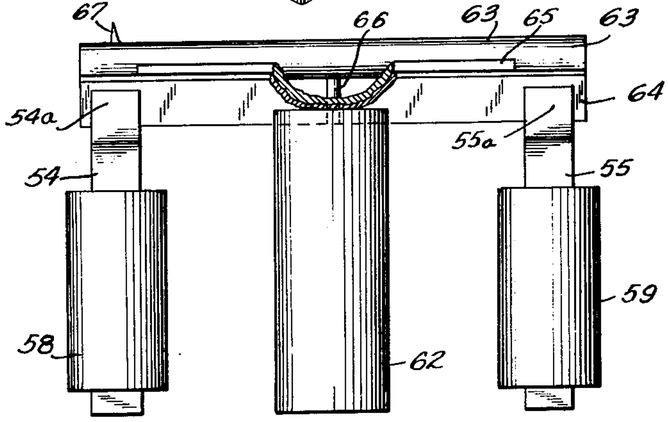
FIG. 6 is a side elevation of the structure shown in FIG. 5 with portions thereof cut away to show the armature mounting more clearly.

FIGS. 5, 6 and 7 illustrate another embodiment of this invention and for clarity the pole structure and armature mounting is shown inverted. The pole structure is designated generally by the numeral 53 and consists of four core members of substantially square or rectangular cross section. Each of the coil cores is formed from a suitable magnetic material of high permeability, such as soft iron, and is surrounded by a coil for which it provides the magnetic core. The core members are designated by the numerals 54, 55, 56 and 57 and their surrounding coils are designated by the numerals 58, 59, 60 and 61 respectively.

Each of the core members is inclinded at its end at an angle to provide a pole face which makes a 45 degree angle with the horizontal. Thus poles *54a*, *55a*, *56a* and *57a* of cores 54, 55, 56 and 57 respectively are each inclined at an angle of 45 degrees to the horizontal. The planes of faces *54a* and *57a* intersect at a right angle beneath the pole faces as shown in FIG. 5 as do the planes of pole faces *55a* and *56a*.

In FIG. 3 pick-up 30 is provided with main plate 31 to complete the magnetic paths. Such a plate may be provided in pick-up device 53 if it is desired; however, I prefer to omit it. In pick-up 53 each of the magnetic paths is completed through air to permanent magnet 62, which is a solid cylindrical member having the end thereof which is nearest armature 63 formed with a V-notch. One side of the V makes a 45 degree angle with the horizontal, and the other side of the V makes a 45 degree angle with the horizontal so that the sides of the V are perpendicular to one another.

Mounting channel 64 is a brass trough having a V cross section with the sides of the V perpendicular to one another and at 45 degrees with the horizontal. The V-trough, which can be formed of any suitable non-magnetic material, is disposed in the V-notch in the permanent magnet so that each of its sides is adjacent a side of the V-notch in the magnet and the trough extends lengthwise to cover the pole faces completely. Thus one side of mounting channel 64 lies adjacent one side of the V-notch in the permanent magnet and also lies adjacent pole faces *54a* and *55a* while the other side of the mounting channel lies adjacent the remaining side of the V-notch in the permanent magnet and pole faces *56a* and *57a*.

Mounting member 64 supports magnetic coupler 65 which also is of V cross section having its sides perpendicular to each other and forming 45 degree angles with the horizontal. Coupler 65 is formed of a magnetic iron which is of high permeability and low reluctance so that there will be a minimum of magnetic drop in the coupler and is disposed lengthwise within mounting member 64. The ends of the magnetic coupler terminate short of the core pieces so that the pole faces do not have any portion of the magnetic coupler above them.

One end of the mounting wire 66 is fastened by brazing or otherwise to mounting channel 64 at a point where its sides intersect and extends upwardly through an opening in the magnetic coupler to support the hollow cylindrical armature which is formed of a magnetic high permeable and low reluctance material and prevent its contact with coupler 65. The mounting wire is brazed at its uppermost end to the armature at *66a*. Wire 66 is a mechanical spring mounting which allows the armature to move in all directions in response to forces applied to stylus 67.

Magnetic coupler 65 allows an extremely light armature of low mass to be used since it provides a path whereby flux can flow into the armature over an extended surface and length of the armature. This reduces the magnetic drop in the armature and minimizes cross talk as will be explained more fully below.

There are four flux paths associated with the structure shown in FIG. 5. One of these paths is composed of the upper end of permanent magnet 62, magnetic coupling member 65, armature 63, pole face 54a, core 54, and the lower end of permanent magnet 62.

A second magnetic path is composed of the upper end of the permanent magnet, the coupling member, armature 63, pole face 57a, core 57, and the lower end of the magnet.

A third magnetic path is composed of the upper end of the permanent magnet, the coupling member, armature 63, pole face 57a, core 57, and the lower end of the magnet.

The fourth magnetic path is composed of the upper end of magnet 62, coupling member 65, armature 63, pole face 56a (not shown), core 56, and the lower end of magnet 62.

The coils of pick-up 53 are connected in the same way that the coils of pick-up 30 are connected. Coils 58 and 59 form a coil pair and are connected to add the voltages generated in these coils by the movement of the armature. Movement of armature 63 toward or away from pole faces 54 and 55a will generate signals in coils 58 and 59 of opposite polarity whose amplitudes are added and fed through suitable amplification to a speaker. Also coils 60 and 61 form a coil pair and are connected in the same manner. Movement of armature 63 toward or away from pole faces 56a and 57a will generate signals in coils 60 and 61 of opposite polarity whose amplitudes are added and fed through suitable amplification to a speaker.

The hum-bucking feature previously discussed in connection with the embodiment of FIG. 3 is also included in this form of the invention since coils 58 and 59 are connected so that the signals generated by extraneous noise in coils 58 and 59 which are of the same polarity will be cancelled. Likewise extraneous noise signals generated in coils 60 and 61 will be cancelled.

Figure 8:
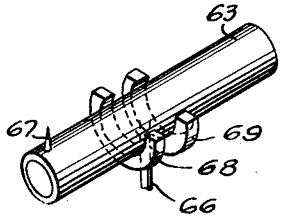
FIG. 8 is a segmentary perspective view of an alternate armature mounting for use in the embodiment of the invention illustrated in FIG. 5.
Figure 9:
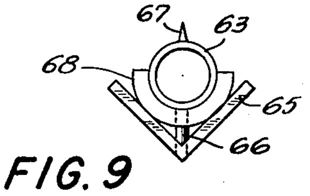
FIG. 9 is a segmentary end view of the alternate armature mounting shown in FIG. 8.

FIGS. 8 and 9 illustrate an alternate mounting for the armature of pick-up device 53. In this alternate mounting, mounting wire 66 is brazed at one end to mounting channel 64 and extends through an opening in magnetic coupler 65 and the uppermost end of the wire is brazed to armature 63 as above.

In this alternate method of mounting, semi-circular viscous damping members 68 and 69 of rectangular or square cross section are utilized. The outermost edge or surface of each of these damping members lies adjacent the upper surface of magnetic coupler 65, and the inner circumferences of the semi-circular damping members lie adjacent a portion of the external surface of armature 63. Members 68 and 69 are positioned as closely as possible to one another on either side of mounting wire 66, and are in effect wedged between the armature and the magnetic coupler. In addition to providing damping for the armature, the semi-circular members insure that armature 63 will not touch magnetc coupling member 65 and aid mounting wire 66 in preventing rotation of armature 63 about its own axis.

As mentioned above, magnetic coupler 65 minimizes cross talk by reducing the magnetic drop in the armature. Cross talk is the phenomena which occurs when a signal designed for one channel of the two-channel system produces a signal in the other channel while producing the desired signal in the desired channel. The magnetic coupler in the embodiment shown in FIG. 5 reduces the cross talk considerably.

As the armature pivots toward one of the pole faces in response to stylus movement, the reluctance in that path is reduced and a larger amount of flux can flow. When a larger amount of flux flows in the armature, the magnetic drop in the armature is increased and the other magnetic paths to which the armature is common suffer a decrease in flux flowing even though the air gap in these particular paths remains constant. The magnetic coupler, which conducts the magnetic signal from the permanent magnet to the armature as closely to the pole faces as is possible without conducting directly to the pole faces, compensates for this magnetic drop. As the armature pivots toward the pole face, it also pivots toward the coupler which is in effect the source of magnetic flux. The armature being closer to the flux source receives an increase in magnetization which overcomes and compensates for the increased magnetic drop, thereby substantially eliminating cross talk from the pick-up device.

An alternate means of compensation which can be used with or without the V channel magnetic coupling means previously described is illustrated in FIGS. 10 and 11, wherein cores 70 and 71 are two cores of a four-core system, such as has been illustrated above. Coils 74 and 75 surround cores 70 and 71 respectively, while coils 76 and 77, which are not shown, surround cores 72 and 73 which also are not shown in the figures.

Permanent magnet 78, which is disposed with its upper end close to armature 79, supports stylus 80 and is mounted in any suitable manner. This armature is of the same design as armatures previously discussed herein.

Compensation in this embodiment is achieved by forming the cores with pole faces whose planes intersect at included angles of more than 90°. In FIG. 10, pole face 70a of core 70 and pole face 71a of core 71 are shown intersecting at included angle A, which is slightly greater than 90° so that as armature 79 moves closer to face 71a decreasing the air gap in that path, it also moves slightly closer to face 70a, thereby overcoming and compensating for the effect in the magnetic path of face 70a of the increased magnetic drop in armature 79 resulting from increased flux flowing in the magnetic path of face 71a, thus substantially eliminating cross talk from this pick-up device.

The phonograph pick-up which is the subject of this invention can be supplied in cartridge form for attachment to a tone arm. In FIG. 12, a phonograph tone arm is designated by the numeral 81 and pick-up cartridge 82 is attached thereto illustrating the proportion of the overall tone arm which the pick-up device occupies.

The teachings of this invention can be utilized for sensing information in binaural record grooves which are cut in other than the 45 degree system. For use in the lateral-vertical system, the pick-up device has a pole structure of the type shown in FIG. 14. The pole structure of pick-up device 87 consists of permanent magnet 88 and cores 89, 90, 91 and 92. The cores are surrounded by coils 93, 94, 95 and 96 respectively.

Armature 97 is of the same design as the armatures previously discussed herein and has attached thereto stylus 98. The armature is supported in any suitable manner so that it has a neutral position equally distant from pole face 89a of core 89 and pole face 90a of core 90. In the neutral position, the armature is also equally distant from pole face 91a of core 91 and pole face 92a of core 92. The planes of pole faces 89a and 90a are parallel with one another and perpendicular to the horizontal, whereas pole faces 91a and 92a lie in the same horizontal plane which is perpendicular to the planes of pole faces 89a and 90a.

Four magnetic paths are provided. The first consists of the upper portion of magnet 88, core 89, face 89a, armature 97 and the lower portion of magnet 88. The second consists of the upper portion of magnet 88, core 90, face 90a, armature 97 and the lower portion of magnet 88. A third path consists of the upper portion of magnet 88, core 91, pole face 91a, armature 97 and the lower portion of magnet 88. The fourth magnetic path consists of the upper portion of magnet 88, core 92, pole face 92a, armature 97 and the lower portion of magnet 88.

In this embodiment, coils 93 and 94 are a coil pair associated with cores 89 and 90 to detect lateral movement of stylus 98, and coils 95 and 96 are a coil pair associated with cores 91 and 92 to detect vertical movement of the stylus.

For example, movement of stylus 98 perpendicularly toward pole face 89*a* will decrease the reluctance of the first magnetic path, alter the quantity of flux flowing in that path and generate signal in coil 93. At the same time, such movement increases reluctance in the second magnetic path and generates a signal in coil 94. The signals generated in coils 93 and 94 are of equal amplitude and opposite polarity. Coil 93 and coil 94 are connected so as to add the voltages generated in these coils by the movement of the armature which results in a single signal of twice the amplitude of either of the generated signals which can be fed to a speaker through suitable amplification to produce sound in accordance with lateral changes in the record groove.

This movement of armature 97, which is parallel to pole faces 91*a* and 92*a*, will not affect the third and fourth magnetic paths. Vertical changes in the groove are sensed by the third and fourth magnetic paths associated with cores 91 and 92. For example, movement of stylus 98 perpendicularly toward pole face 91*a* will create an increase in the flux lines flowing in the third magnetic path and a decrease in the flux flowing in the fourth magnetic path, thus generating two signals of equal amplitude and opposite polarity in coils 95 and 96 whose amplitudes are added electrically to produce a single signal which is fed to a speaker to produce sound in accordance with vertical changes in the record groove.

The hum-bucking feature is also present in this embodiment since extraneous noise will generate signals in the coils of like polarity and substantially equal magnitudes so that these signals will be cancelled out and will not reach the speaker.

The moving components of a pick-up device such as the armature and stylus assembly are subject to wear and with use wear out, whereas the fixed components such as the pole structure are subject to very little wear and can provide satisfactory service for an extended period. FIGS. 15 through 23 illustrate an embodiment of my invention wherein the moving components of the pick-up are contained in a separate removable stylus assembly which can be inserted or removed from the body of the pick-up cartridge by a simple sliding action so that the stylus assembly can be easily replaced when it is worn or damaged without the necessity of returning the cartridge to the shop or factory.

Figure 15:
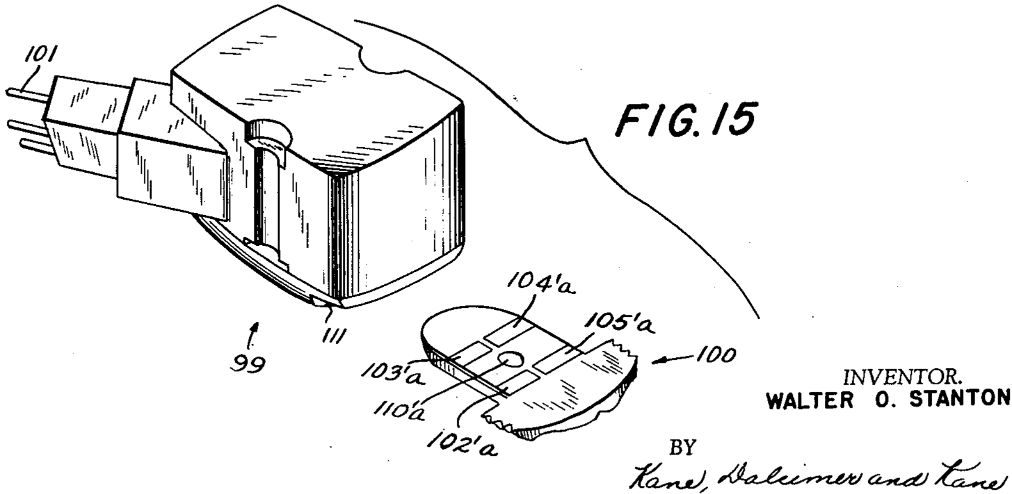
FIG. 15 is an exploded view in perspective of a pick-up cartridge constructed in accordance with the teachings of this invention with the detachable stylus assembly removed therefrom.
Figure 17:
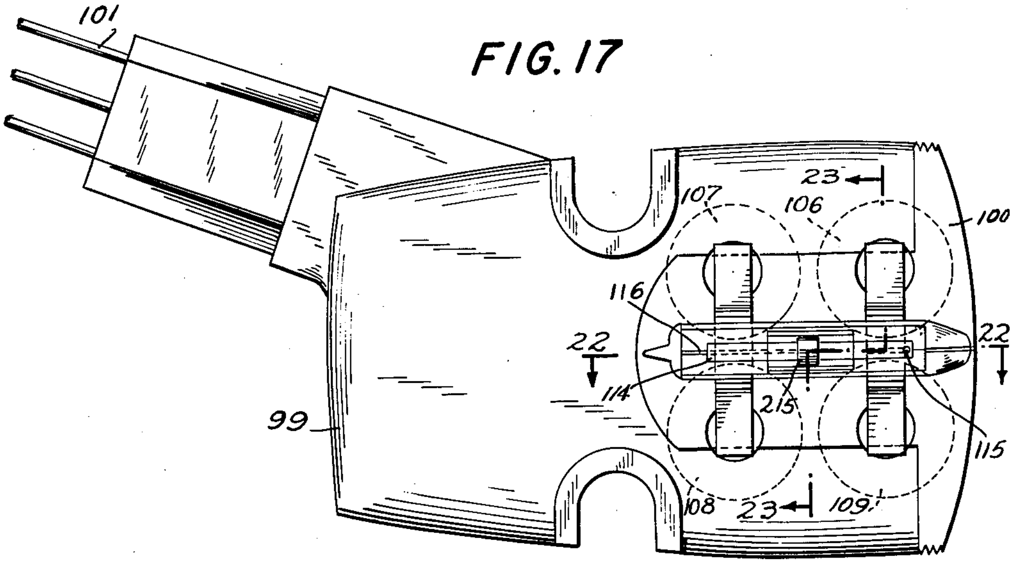
FIG. 17 is a bottom plan view of the pick-up cartridge shown in FIG. 15 illustrating the fixed and detachable units assembled.
Figure 18:
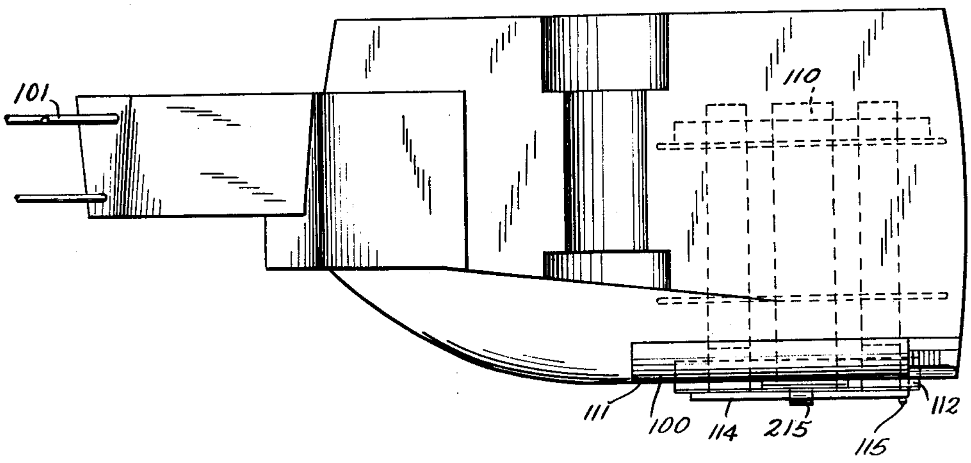
FIG. 18 is a side elevation of the pick-up cartridge shown in FIG. 17.
Figures 19, 20, 21:
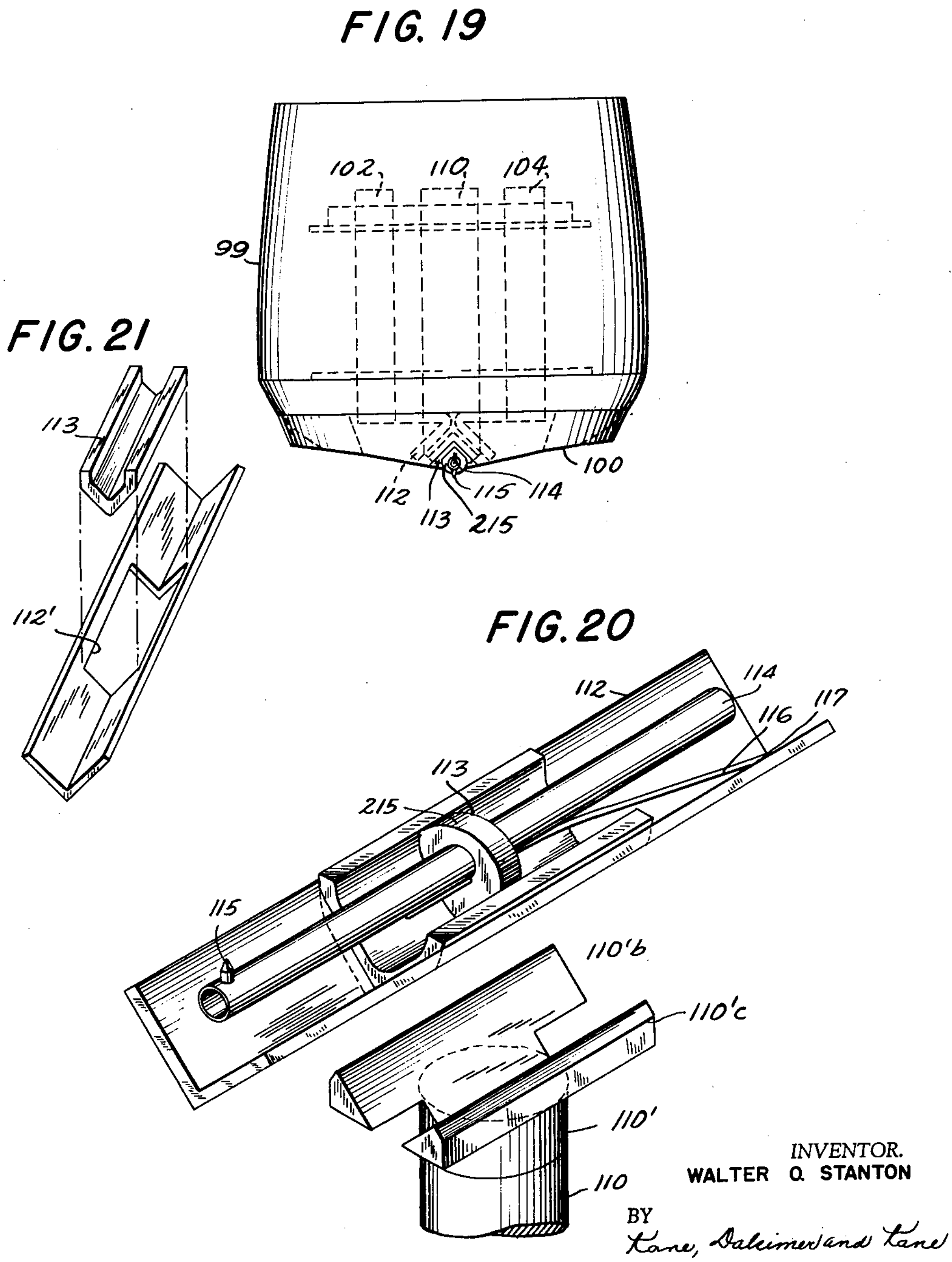
FIG. 19 is a front elevation of the pick-up cartridge shown in FIG. 17.
FIG. 20 is an inverted exploded perspective of portions of the stylus assembly of the pick-up shown in FIG. 17.
FIG. 21 is an inverted exploded perspective of portions of the stylus assembly shown in FIG. 20 illustrating in detail the magnetic coupling member and the mounting channel.
Figure 22:
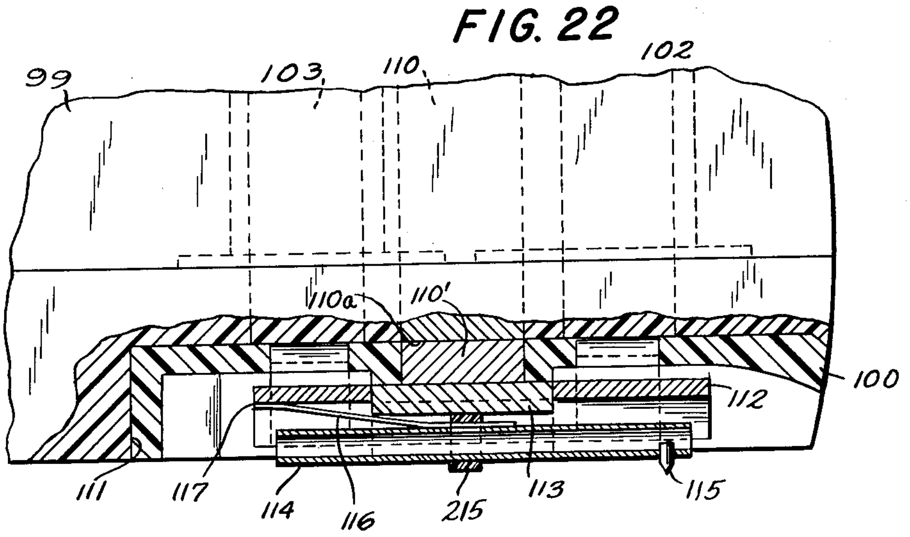
FIG. 22 is an enlarged longitudinal cross-section taken along the line 22—22 of FIG. 17.
Figure 23:
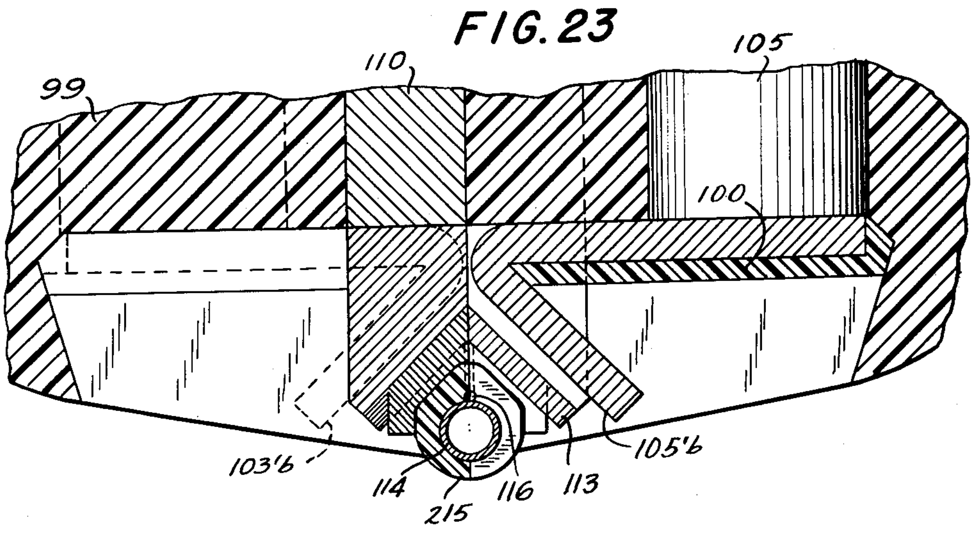
FIG. 23 is an enlarged transverse cross-section taken along the line 23—23 of FIG. 17.

Referring to FIG. 15, pick-up cartridge 99 is illustrated with replaceable stylus assembly 100 removed therefrom. The supporting structure for the cartridge is molded or cast from a suitable dielectric plastic material or casting resin such as phenolic resins, ureas, nylon and polystyrene. The supporting structure is molded so as to conveniently embrace and support the several fixed parts of the pick-up unit and so as to present a pleasing external appearance. Thus, embedded in supporting structure 99 are solid cylindrical cores 102, 103, 104 and 105 and their associated coils 106, 107, 108 and 109 respectively disposed vertically with parallel axis disposed in the form of a square with each core located at a corner thereof. The coils are connected by suitable leads to the contact prongs indicated generally by the numeral 101 in FIG. 15 which project from one end of the cartridge whereby the pick-up may be connected to an amplifying system in the usual manner.

Permanent magnet 110, which is also of solid cylindrical configuration, is embedded in supporting structure 99 in the center of the four cores with its axis parallel to the axes of the cores. The four cores are approximately equal in length to the length of the permanent magnet and are formed of a material of high magnetic permeability, such as soft iron or a nickel iron alloy or any other suitable magnetic material.

Each of the cores 102, 103, 104 and 105 terminates in flat lower surfaces 102*a*, 103*a*, 104*a* and 105*a* respectively and permanent magnet 110 also terminates at its lowermost end in flat horizontal surface 110*a*. The coils are connected within the cartridge with coils 108 and 109 forming a coil pair and coils 106 and 107 forming a coil pair. The coils in each of these coil pairs are connected electrically to add the magnitudes of opposite polarity signals generated therein.

The body of the replaceable stylus assembly 100 is also molded, preferably of the same material used to mold the fixed portion of the cartridge, and contains the remaining components of the pick-up assembly. The outline of the removable stylus assembly is of such configuration that the assembly can be easily inserted in slot 111 in the undersurface of cartridge 99 and remain there with a tight fit.

When the pick-up is fully assembled, surface 110'*a* of permanent magnet extension 110', which is permanently molded in replaceable stylus assembly 100, is adjacent surface 110*a* of permanent magnet 110. Permanent magnet extension 110' is a magnetic coupler which forms a continuation of permanent magnet 110 and is composed of the same material as the permanent magnet and is shown in inverted view in FIG. 20. The body portion of extension 110' is cylindrical and of the same diameter as is permanent magnet 110 so that surface 110*a* and surface 110'*a* are completely adjacent when the replaceable stylus assembly is inserted in slot 111.

A V-groove is formed in the other end of extension 110' and each side of the V-groove terminates in an elongated horizontal flange so that it is in the configuration of a T with the flange forming the upper or horizontal portion of the T. The facing surfaces of the sides of the V-groove form right angles with one another and 45 degree angles with the horizontal so that the facing surface of flange 110'*b* makes a 45 degree angle with the horizontal and a right angle with the facing surface of flange 110'*c*, which also makes a 45 degree angle with the horizontal. Mounting channel 112, which is formed of any suitable non-magnetic material, such as brass, has a V cross section with its sides which are perpendicular to one another, making 45 degree angles with the horizontal and is disposed in the V-groove in the permanent magnet. As disposed therein, a portion of the outer surface of one side of the mounting channel is adjacent the inner surface of flange 110'*b* and a portion of the outer surface of the remaining side of the mounting channel is adjacent the inner surface of flange 110'*c*. Rectangular slot 112' is formed in the mounting channel directly above the permanent magnet so that magnetic coupler 113, which is inserted in slot 112', is adjacent the inner sides of the V-groove in the permanent magnet.

Magnetic coupler 213 is also of V cross section having its sides perpendicular to each other and forming 45 degree angles with the horizontal. Coupler 113, which is formed of a magnetic iron of high permeability and low reluctance so that there will be a minimum of magnetic drop in the coupler, is shaped so that one of its sides is adjacent flange 110'*b* of the permanent magnet and its other side is adjacent flange 110'*c* of the permanent magnet.

Hollow cylindrical armature 114, which is also formed from a magnetic iron which is of high permeability and low reluctance in order that there will be a minimum magnetic drop in the armature, has stylus 115 extending from one end thereof and is maintained within channel 112 with its axis parallel to the sides of channel 112 by means of mounting block 215. The mounting block supports the armature at its center and mounting spring 116 which has one end thereof attached to block 215 and the other end thereof rigidly fastened to mounting channel 112 at point 117 supports the mounting block.

Mounting block 215, which is a block of any suitable damping material, such as viscoloid, completely surrounds the armature at the center thereof with a portion of its periphery adjacent the inner surface of magnetic coupler 113 so that the armature cannot touch the magnetic coupler or the brass mounting channel.

Mounting wire 116 is any suitable spring wire which can support the viscoloid block and the armature and stylus in cantilever fashion.

Replaceable stylus assembly 100 also has molded therein pole members 102′, 103′, 104′ and 105′ which are the terminating poles for cores 102, 103, 104 and 105 respectively. Each of these pole members is formed from the core material and is a magnetic coupler within a rectangular cross section and upper surface adjacent the lower surface of its corresponding core member when the replaceable stylus assembly is positioned within slot 111 of the cartridge, and has a second surface forming a 45 degree angle with the horizontal and parallel to a side of mounting member 112.

Thus in the drawings, surface 102′*a* of pole member 102′ is adjacent surface 102*a* of core 102 when the cartridge is fully assembled and pole face 102′*b* of pole member 102′ is parallel to a side of the mounting channel. Pole face 105′*b* of pole member 105′ is parallel to a side of the mounting channel and is adjacent surface 105*a* of core 105.

Likewise, pole faces 103′*b* and 104′*b* of pole members 103′ and 104′ respectively are parallel to sides of the mounting channel. Surface 103′*a* of pole member 103′ is adjacent surface 103*a* of core 103 and surface 104′*a* of pole member 104′ is adjacent surface 104*a* of core 104 when the cartridge is fully assembled.

Figure 16:
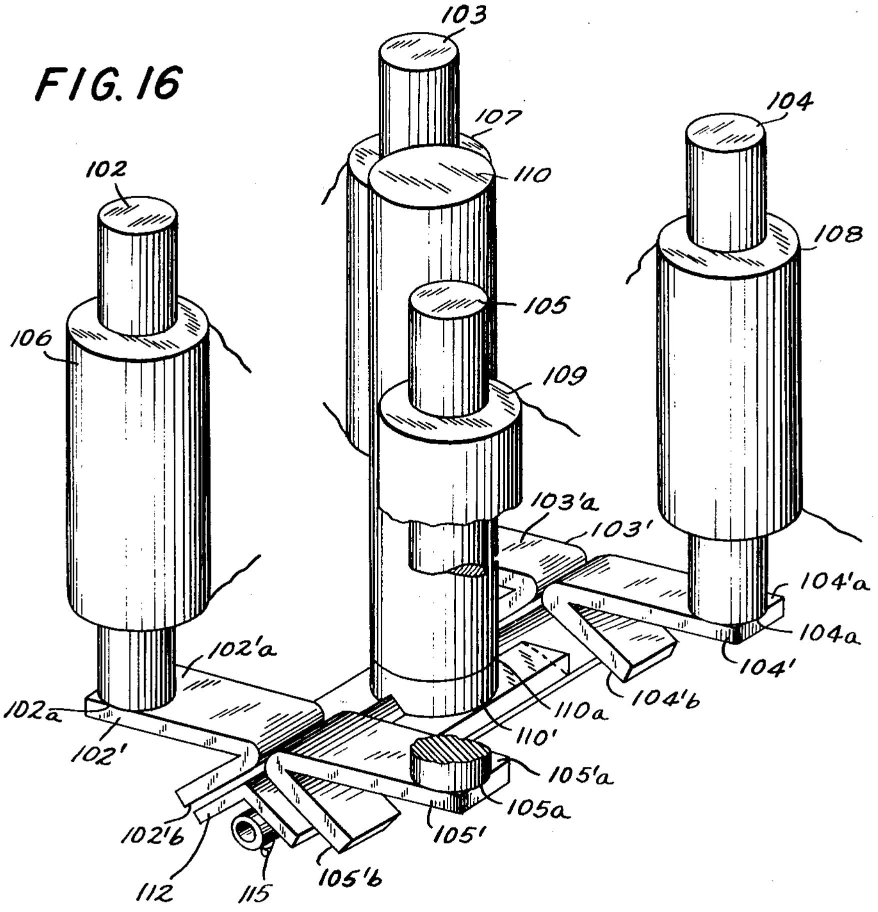
FIG. 16 is a simplified diagrammatic perspective view of the pole structure and stylus assembly of the pick-up cartridge shown in FIG. 15.

The cartridge in the fully assembled condition has four flux paths. Referring to FIG. 16, one of these flux paths is composed of the permanent magnet extension 110′, magnetic coupling member 113, armature 114, pole member 105′, core 105 and permanent magnet 110.

A second magnetic path is composed of permanent magnet extension 110′, coupling member 113, armature 114, pole member 104′, core 104 and permanent magnet 110.

A third magnetic path is composed of the permanent magnet extension, the coupling member, the armature, pole member 102′, core 102 and the permanent magnet.

The fourth magnetic path is composed of permanent magnet extension 110′, coupling member 113, armature 114, pole member 103′, core 103 and permanent magnet 110.

The operation of the pick-up shown in FIG. 16 is substantially the same as that of the pick-ups shown in the previous embodiments described herein. Movement of armature 114 toward or away from pole faces 105′*b* and 104′*b* will generate signals in coils 109 and 108 of opposite polarity whose magnitudes are added and fed through suitable amplification to a speaker. Also, movement of armature 114 toward or away from pole faces 102′*b* and 103′*b* will generate signals in coils 106 and 107 of opposite polarity whose amplitudes are added and fed through suitable amplification to a speaker. Thus, detection of binaural sound from a V-groove of a phonograph record is achieved.

The hum-bucking feature previously discussed is also incorporated in this device since coils 109 and 108 are connected so that the signals generated by extraneous fields in these coils, which are of the same polarity, will be cancelled. The same effect is achieved in coils 106 and 107 and signals developed therein by extraneous fields will be cancelled.

An alternate form of detachable stylus assembly for use with pick-up cartridge 99 is illustrated in FIGS. 24 through 27 wherein the detachable stylus assembly is designated generally by the numeral 120. The body of the replaceable stylus assembly 120 is also molded, preferably of the same material used to mold the fixed portion of the cartridge, and contains the remaining components of the pick-up assembly. The outline of the removable stylus assembly is of such configuration that the assembly can be easily inserted in slot 111 in the under surface of cartridge 99 and remain there with a tight fit and in the drawings is shown similar to the outline of movable stylus assembly 100.

Figure 24:
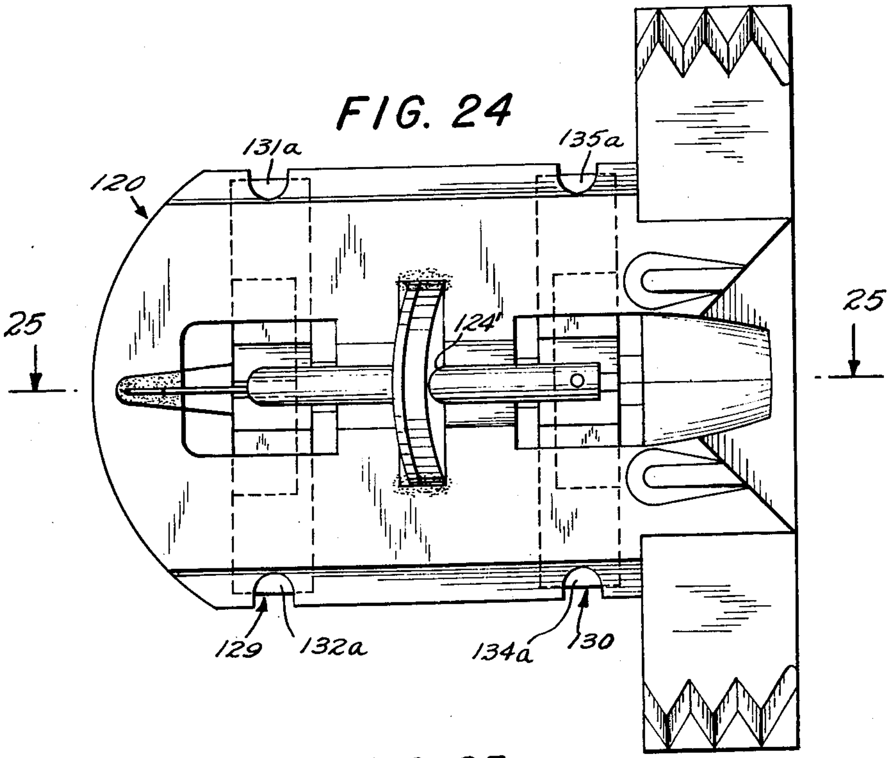
FIG. 24 is a bottom plan view of an alternate form of detachable stylus assembly for use with the pick-up cartridge shown in FIG. 15.

In the embodiment shown in FIG. 24, permanent magnet extension 121 which is the magnetic coupler forming a continuation of permanent magnet 110 in cartridge 99 has a substantially flat face 121′ with rectangular slot 122 laterally disposed therein. Mounting bridge 123 and damping pad 124 are disposed within slot 122 and cemented to body 120 and magnetic coupler 121 with portions thereof extending beneath the magnetic pole coupler. Mounting member 123 is formed of nitrocellulose and damping pad 124 is formed of viscoloid, but of course suitable substitutes for these materials can be used. The bridge member 123 and damping pad 124 which is attached thereto mount and locate armature 125 which passes therethrough beneath the face of the pole coupler.

Armature 125 is formed of magnetic material and carries stylus 126 at one end in the manner previously described herein.

The armature is further supported for oscillatory movement by resilient wire 127 to which it is fastened and which has hook end 128 cemented to body 120.

Figures 25, 26, 27:
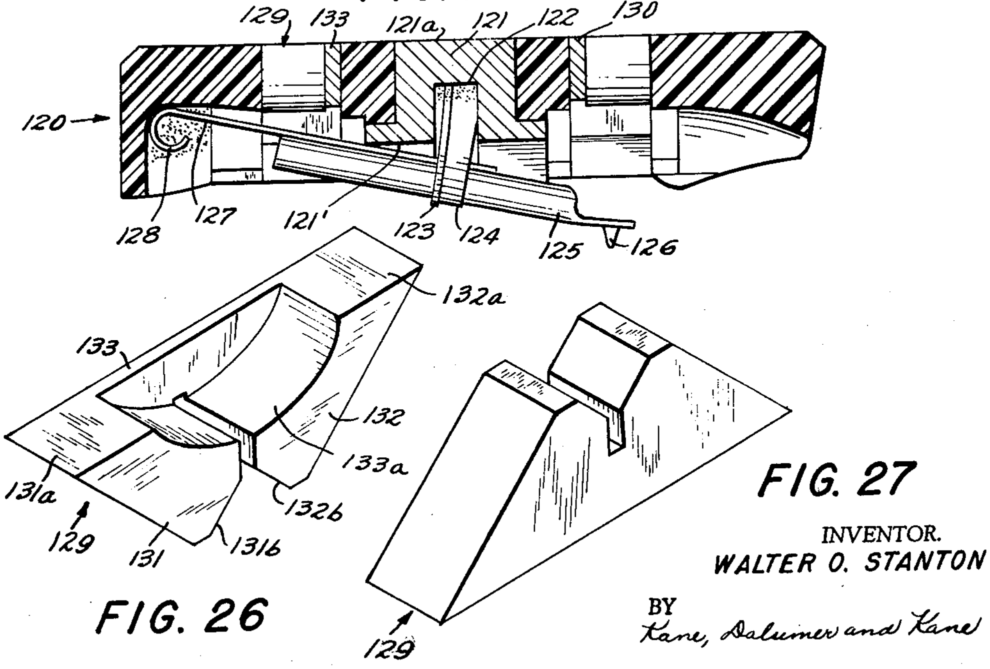
FIG. 25 is a longitudinal cross-section taken along the line 25—25 in FIG. 24.
FIG. 26 is a perspective view from above of a pole member used in the stylus assembly shown in FIG. 24.
FIG. 27 is a perspective view from beneath of a pole member used in the stylus assembly shown in FIG. 24.

Core coupling member 129, formed of magnetic material, is shown in detail in FIGS. 26 and 27. Member 129 magnetically couples cores 103 and 104 to armature 125 in a manner somewhat similar to the manner in which members 103′ and 104′ coupled armature 114 to these cores in the previous embodiment. Core coupling member 130 is identical to member 129 and couples cores 102 and 105 to armature 125.

Since core coupling members 129 and 130 are identical in configuration only one of these—member 129 will be described in detail in connection with FIGS. 26 and 27.

The coupling member 129 has two oppositely located pole pieces 131 and 132 and each is formed with a surface which makes a right angle with the surface of the other. Thus in the drawings surface 131*b* of piece 131 is shown forming substantially a right angle with surface 132*b* of piece 132. The upper portion of pole piece 131 is formed with flat surface 131*a* which lies adjacent surface 103*a* of core 103 when member 120 is inserted in recess 111 and the upper portion of pole piece 132 is formed with flat surface 132*a* which lies adjacent surface 104*a* of core 104 when the cartridge is fully assembled. The surfaces 131*a* and 132*a* respectively coincide to surfaces 103′*a* and 104′*a* shown in FIG. 15.

In the embodiment shown in FIGS. 24 through 27 the pole pieces are joined by integral feed back member 133 which enables the magnetic path in which pole piece 131 lies to be coupled to the magnetic path in which pole piece 132 lies.

The upper portions of the pole pieces are cut away to form an arcuate recess 133*a* so that when member 129 is positioned on the stylus assembly it will not interfere with movements of the armature 125.

Core coupling members 129 and 130 are formed of magnetic iron of high permeability and low reluctance so that there will be a minimum of magnetic drop in the couplers. Flat surfaces of core coupling member 130 are designated by numerals 134*a* and 135*a* coinciding with surfaces 131*a* and 132*a* of coupling member 129 respectively.

Thus when the cartridge is fully assembled, surface 131*a* of pole member 129 is adjacent surface 103*a* of core 103 and surface 132*a* of pole member 129 is adjacent surface 104*a* of core 104. Likewise surface 135*a* of core member 130 is adjacent surface 102*a* of core 102 and surface 134*a* of core member 130 is adjacent surface 105*a* of core 105.

The cartridge in the fully assembled condition has four flux paths. One of these flux paths is composed of magnet coupler 121 which has the upper surface thereof adjacent surface 110*a* of the permanent magnet, armature 125, face 131*a*, core 103 and permanent magnet 110.

A second magnetic path is composed of magnet coupler 121, armature 125, surface 132*a*, core 104 and permanent magnet 110.

A third magnetic path is composed of the magnet coupler 121, armature 125, surface 135*a*, core 102 and permanent magnet 110.

The fourth magnetic path is composed of magnet coupler 121, armature 125, core surface 134*a*, core 102 and permanent magnet 110.

The operation of the pick-up when the detachable stylus assembly shown in FIGS. 24 through 27 is used is substantially the same as that of the pick-up shown in the previous embodiments described herein except that compensation for avoiding cross-talk is provided in a different manner which will be described below.

Movement of armature 125 toward or away from pole faces 131*a* and 135*a* will generate signals in coils 107 and 106 of opposite polarity whose magnitudes are added and fed through siutable amplification to a speaker. Also movement of armature 125 toward or away from faces 132*a* and 134*a* will generate signals in coils 108 and 109 of opposite polarity whose amplitudes are added and fed through suitable amplification to a speaker. Thus detection of binaural sound from a V-groove of a phonograph record is achieved.

In this embodiment compensation is provided by means of the compensating coupler 133 which joins opposite pole faces. Compensating feed back member 133 operates to shunt a portion of increased flux through a core resulting from movement of armature 125 into the core associated with the opposite face to which the armature moved parallel but which has suffered a decrease of flux flow due to increased magnetic drop in the armature. The path associated with the face to which the armature moves perpendicularly is referred to as the signal path or channel and the path associated with the opposite face is referred to as the quiet channel. The occurrence being instantaneous.

For example, as armature 125 moves closer to face 131*b*, which then becomes the signal channel, the air gap in that path decreases so that there is an increase in flux flowing in core 103 and armature 125 and a corresponding decrease in flux flowing in core 104, which is the quiet channel, even though the armature has moved parallel to face 132*b*. The feed back member 133 directs a portion of the flux from face 131*b* to core 104 to compensate for the loss in the quiet channel from increased magnetic drop in the armature.

Likewise, if armature 125 is moved perpendicularly away from face 131*b*, the air gap in its path increases so that there is a decrease in flux flowing in core 103 which is at that instant the core in the signal channel. As a result there is a decrease in the flux flowing in armature 125 and a consequent decrease in the magnetic drop in the armature resulting in an increase of flux flowing into face 132*b* which at that instant lies in the path associated with the quiet channel even though the armature has moved parallel to face 132*b*.

In this instance flux is drawn from face 132*b* through compensation member 133 to compensate for the gain in the quiet channel due to decreased magnetic drop in the armature. Thus the effect of compensation member 133 is to stabilize the system and overcome the effects of magnetic non linearity due to changes in the magnetic drop in the armature.

The hum-bucking feature previously discussed is also incorporated in the device of this embodiment since the coils 109, 108, 106 and 107 which provide for hum-bucking are in main cartridge member 99 and operate so that the signals developed in coils 109 and 108 by extraneous fields and the signals developed in coils 106 and 107 by extraneous fields will be cancelled.

The invention can be utilized in pick-ups which mount two styli in back to back fashion. In FIG. 13 molded pick-up body 140 contains permanent magnet 141 and four coils 142, 143, 144 and 145 with associated cores arranged in the manner shown which is identical with the arrangement shown in FIG. 16. Body 140 is formed with identical slots 146 and 147, which is not shown in FIG. 13, for receiving replaceable stylus assemblies 148 and 149, respectively. Each of these replaceable stylus assemblies is identical with assembly 120 shown in FIGS. 24 and 25.

When the pick-up shown in FIG. 13 is used either the stylus of assembly 148 or 149 is selected and inserted in the groove of a record while the stylus of the remaining assembly is not. The pick-up then interprets the information in the record groove in the same manner as does the pick-up shown in FIG. 15 through 27.

It will thus be seen that I have provided an improved phonograph pick-up of the magnetic type which can be employed with a binaural system utilizing phonograph records and which provides a highly uniform and accurate response while causing a minimum of record wear and substantially eliminating extraneous noise signals; and which has a replaceable stylus assembly permitting the stylus to be readily replaced when it is worn or broken.

Thus, among others, the several objects in the invention as specifically aforenoted, are achieved. Obviously, numerous changes in construction and rearrangement of parts might be resorted to without departing from the spirit of the invention as defined by the claims.

I claim:

1. A magnetic pick-up for use with stereophonic records of the type having a groove with two boundary surfaces of the groove forming two separate sound channels disposed at an angle of approximately 90 degrees to each other comprising: a supporting structure; a current generating system including a pair of coils supported by said supporting structure; a magnetic system supported by said supporting structure and including a permanent magnet and a pair of cores of magnetic material for said coils having plane surfaces disposed angularly at an included angle to each other and a moving system including a stylus for simultaneously engaging both surfaces of the record groove, means including a magnetic armature supporting the stylus and mounting means for supporting the moving system on the supporting structure so that the armature is normally disposed within the magnetic field of said magnet with a portion within the angle presented by said plane surfaces and so that said portion may move universally with respect to said two plane surfaces in response to movemnts of the stylus in response to the modulations of the two boundary surfaces of the record groove said pickup including means for compensating for the flux drop in the armature as it moves towards one of said plane surfaces.

2. A magnetic pick-up for use with stereophonic records of the type having a single groove with two boundary surfaces of the groove forming two separate sound channels disposed at an angle of approximately 90 degrees to each other comprising: a supporting structure; a current generating system including two pairs of coils supported by said supporting structure with the coils of each pair being axially spaced from each other and connected in electrical opposition and with each core being proximately positioned with respect to the corresponding coil of the other pair; a magnetic circuit supported by said supporting structure including a permanent magnet and two pairs of cores of magnetic material for said coil pairs with the cores of each pair having plane surfaces disposed in the same plane as each other and disposed at an included angle with respect to the plane surfaces of the cores of the other pair; and a moving system including a stylus for simultaneously engaging both sides of a record groove, a magnetic armature supporting the stylus adjacent one of its ends, and mounting means for supporting the armature on the supporting structure at an intermediate portion of the armature so that it is within the magnetic field of said permanent magnet and portions thereof are normally disposed within the angles presented by the plane surfaces and equally spaced from the plane surfaces and so that the portions of the armature within the angles may move universally with respect to the plane surfaces of said respective pairs of cores in response to movements of the stylus in response to the modulations of the two surfaces of the record groove, said pickup being provided with means for compensating for flux drop in the magnetic armature as it moves towards one of the plane surfaces and the armature is a hollow cylindrical member of low mass whose axis is disposed normally within a plane bisecting the included angle of the record groove and containing a line tangent to the record groove in the absence of stylus movement.

3. A magnetic pick-up for use with stereophonic records of the type having a groove with the two boundary surfaces of the groove forming two separate sound channels disposed at an angle of approximately 90 degrees to each other comprising: a current generating system including a pair of coils; a magnetic system including a permanent magnet and a pair of cores of magnetic material for said coils; a supporting structure for said magnetic system and generating system provided with a recess which extends at least in part adjacent an end of each of the cores and the permanent magnet; and a removable stylus assembly including a supporting slide cooperable to be inserted in the recess in the supporting structure; a magnetic coupling system supported in said slide and including a magnetic coupler having a surface adjacent said permanent magnet when the removable stylus assembly is positioned in said recess and a pair of magnetic couplers having surfaces adjacent said cores when the removable stylus assembly is positioned in said recess, each of the coupler of said pair having plane surfaces disposed angularly at an included angle to each other of approximately 90 degrees; and a moving system supported by said slide including a stylus for simultaneously engaging both surfaces of the record groove, a magnetic armature supporting the stylus, mounting means for supporting the armature on the slide within the field of the permanent magnet so that a portion thereof is normally disposed within the angle presented by said plane surfaces and so that said portion may move universally in directions parallel with and perpendicular to said two plane surfaces in response to movement of the stylus in response to the modulations of the two boundary surfaces of the record groove and an elongated magnetic compensating member of V cross section having sides which encompass the armature and conduct lines of magnetic flux thereto throughout the major portion of its length.

4. A magnetic pick-up for use with stereophonic records of the type having a groove with two boundary surfaces of the groove forming two separate sound channels disposed at an angle to each other in accordance with claim 3 in which the sides of the elongated magnetic compensating member form an included angle approximately equal to the angle formed by the plane surfaces of the pair of couplers so that movement of the armature toward or away from said plane surfaces results in a like movement of a portion of the armature toward or away from said compensating member.

5. A magnetic pick-up for use with stereophonic records of the type having a groove with two boundary surfaces of the groove forming two separate sound channels disposed at an angle to each other comprising: a supporting structure; a current generating system including a pair of coils supported by said supporting structure; a magnetic circuit supported by said supporting structure including a source of magnetic flux and a pair of cores of magnetic material for said coils defining a pair of flux paths and each core having a plane surface disposed angularly at an angle to the plane surface of the other and means magnetically coupling said flux paths in the form of a magnetic member joining each of the cores in the vicinity of the angularly disposed plane surfaces so that a portion of the flux flowing in one of the plane surfaces is directed to flow in the core associated with the remaining plane surface; and a moving system including a stylus for simultaneously engaging both sides of the record groove, means mounting said stylus on the supporting structure, a magnetic member connected to and movable with said stylus, and mounting means for supporting said magnetic member on the supporting structure within the field of the source of magnetic flux so that a portion thereof is normally disposed within the angle presented by said plane surfaces and so that said portion can move universally in directions parallel with and perpendicular to said two plane surfaces in response to the movement of the stylus in response to the modulations of the two boundary surfaces of the record groove.

6. A magnetic pick-up for use with stereophonic records of the type having a groove with two boundary surfaces of the groove forming two separate sound channels disposed at an angle of approximately 90 degrees to each other comprising a supporting structure, a current generating system including a pair of coils supported by said supporting structure, a magnetic system supported by said supporting structure and including a permanent magnet and a pair of cores of magnetic material for said coils defining a pair of flux paths and each having a plane surface disposed angularly to the plane surface of the other at an angle of approximately 90 degrees, and a moving system including a stylus for simultaneously engaging both surfaces of the record groove, a magnetic armature supporting the stylus, mounting means for supporting the armature on the supporting structure within the field of the permanent magnet so that a portion thereof is normally disposed within the angle presented by said plane surfaces and so that said portion may move universally in directions parallel with and perpendicular to said two plane surfaces in response to movements of the stylus in response to the modulations of the two boundary surfaces of the record groove, and a rigid member formed of magnetic material joining the cores to each other so that a portion of increased flux flowing in the flux path associated with the plane surface toward which the armature portion may move can be directed into the flux path associated with the remaining plane surface.

7. A magnetic pick-up for use with stereophonic records of the type having a groove with two boundary surfaces of the groove forming two separate sound channels disposed at an angle of approximately 90 degrees to each other comprising a supporting structure, a current generating system including a pair of coils supported by said supporting structure, a magnetic system supported by said supporting structure and including a permanent magnet and a pair of cores of magnetic material for said coils defining a pair of flux paths and each having a plane surface disposed angularly to the plane surface of the other at an angle of no less than approximately 90 degrees, and a moving system including a stylus for simultaneously engaging both surfaces of the record groove, a magnetic armature supporting the stylus, mounting means for supporting the armature on the supporting structure within the field of the permanent magnet so that a portion thereof is normally disposed within the angle presented by said plane surfaces and so that said portion may move universally in directions parallel with respect to said two plane surfaces in response to movements of the stylus in response to the modulations of the two boundary surfaces of the record groove, and a coupling member formed of a magnetic material joining each of the cores in the vicinity of the angularly disposed plane surfaces so that a portion of increased flux flowing in the flux path associated with the plane surface toward which the armature portion may move can be directed to flow in the core associated with the remaining plane surface.

8. A magnetic pickup for use with stereophonic records of the type having a single V-shaped groove with the two sides of the groove being disposed at an angle of approximately 90° to each other and forming sound tracks for first and second sound channels, said pickup comprising: means providing a supporting structure; a stereophonic current-generating system supported by said supporting structure and including a first pair of current-generating coils for the first sound channel and a second pair of current-generating coils for the second sound channel with the two coils in each pair being connected together; means providing a magnetic flux path supported by said supporting structure and including a permanent magnet, first and second pairs of cores made of magnetic material magnetically connected to said permanent magnet and associated with said first and second pair of coils with each core extending through its corresponding coil and first and second pairs of pole pieces for the first and second channels magnetically connected to said cores, the pole pieces in the first pair being disposed at an included angle to the pole pieces in the second pair, said respective pairs of pole pieces being disposed at opposite sides of the longitudinal axis of the pickup and the pole pieces in each pair being spaced from each other longitudinally of the pickup and being disposed at the same angle and so as to be in opposite confronting relationship to the corresponding sound track of the record groove when the cartridge is in record playing position; and a moving system comprising a stylus for engaging the sound track of the record groove, an elongated armature supporting the stylus and supporting means for supporting the armature in alignment with the longitudinal axis of the pickup in the included angle formed by said pole pieces with a pole piece of each pair being disposed adjacent respectively opposite end portions of the armature, said supporting means including a fulcrum support at an intermediate portion of the armature around which the armature may pivot universally with movements of the stylus in response to modulations of the two sound tracks of the record groove, said pickup being provided with means for compensating for flux drop in the magnetic armature as it moves towards one of the pole pieces.

9. A magnetic pickup for use with stereophonic records of the type having a single V-shaped groove with the two sides of the groove being disposed at an angle of approximately 90° to each other and forming sound tracks for first and second sound channels as set forth in claim 8 in which the pole pieces of the respective first and second channels are interconnected so as to compensate for the flux drop in the armature.

10. A magnetic pickup for use with stereophonic records of the type having a single V-shaped groove with the two sides of the groove being disposed at an angle of approximately 90° to each other and forming sound tracks for first and second sound channels as set forth in claim 8 in which a magnetic coupler made of magnetic material and magnetically connected to the permanent magnet is arranged in inductive relationship with the central portion of the armature and extends towards both ends thereof to compensate for flux drop in the armature.

11. A magnetic pickup for use with stereophonic records of the type having a single V-shaped groove with the two sides of the groove being disposed at an angle of approximately 90° to each other and forming sound tracks for first and second sound channels as set forth in claim 8 in which the pole pieces in one pair are disposed at an angle greater than 90° with respect to the pole pieces of the other pair so as to compensate for flux drop in the armature.

References Cited in the file of this patent

UNITED STATES PATENTS

| | | |
|---|---|---|
| 2,093,540 | Blumlein | Sept. 21, 1937 |
| 2,114,471 | Keller et al. | Apr. 19, 1938 |
| 2,416,082 | Balmer | Feb. 18, 1947 |
| 2,554,696 | Bruderlin | May 29, 1951 |
| 2,622,156 | Baker | Dec. 16, 1952 |
| 2,678,412 | Smeltz | May 11, 1954 |
| 2,844,767 | Houdek | July 22, 1958 |
| 2,864,897 | Kaar | Dec. 16, 1958 |
| 2,875,282 | Reiback | Feb. 24, 1959 |
| 2,917,590 | Stanton | Dec. 15, 1959 |